July 25, 1939.   E. NÄDELIN   2,167,308
MACHINE TOOL FOR BAR STOCK
Filed June 10, 1938   5 Sheets-Sheet 1
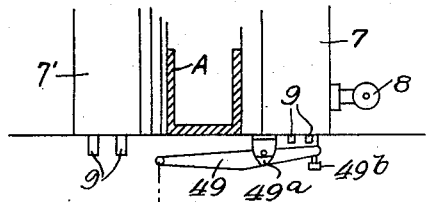
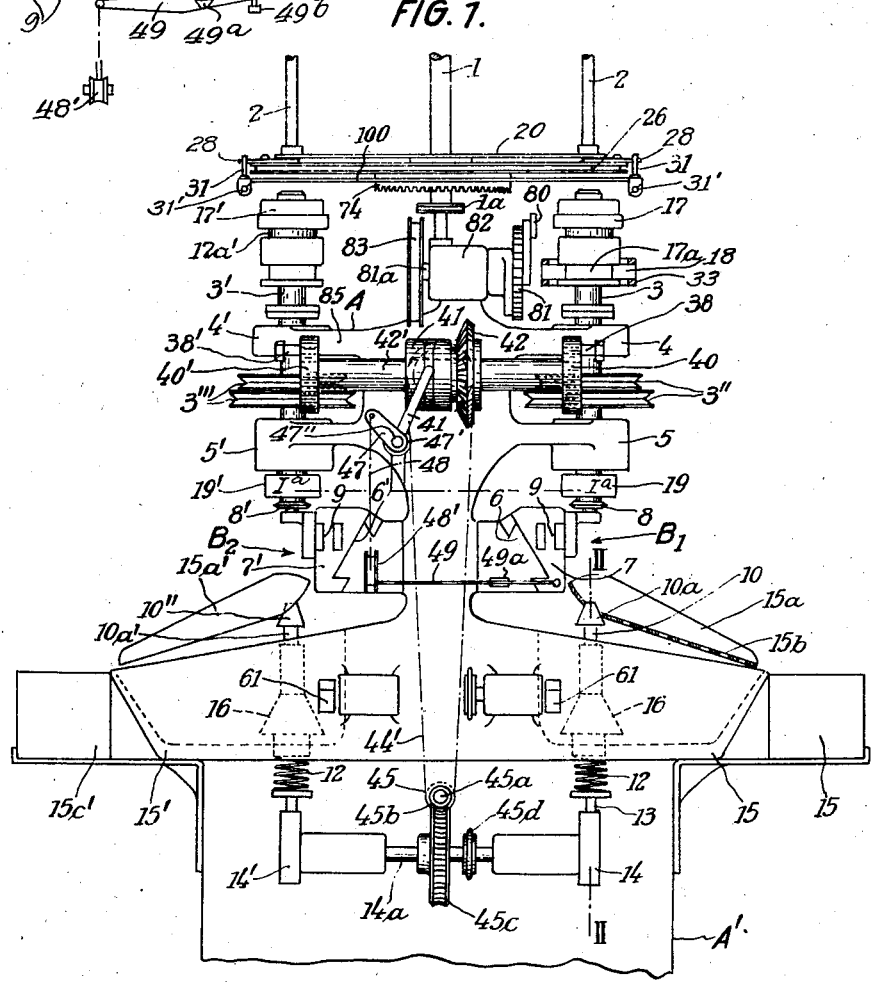
Inventor:
E. Nädelin
By
Glascock Downing & Siebold
Attorneys.

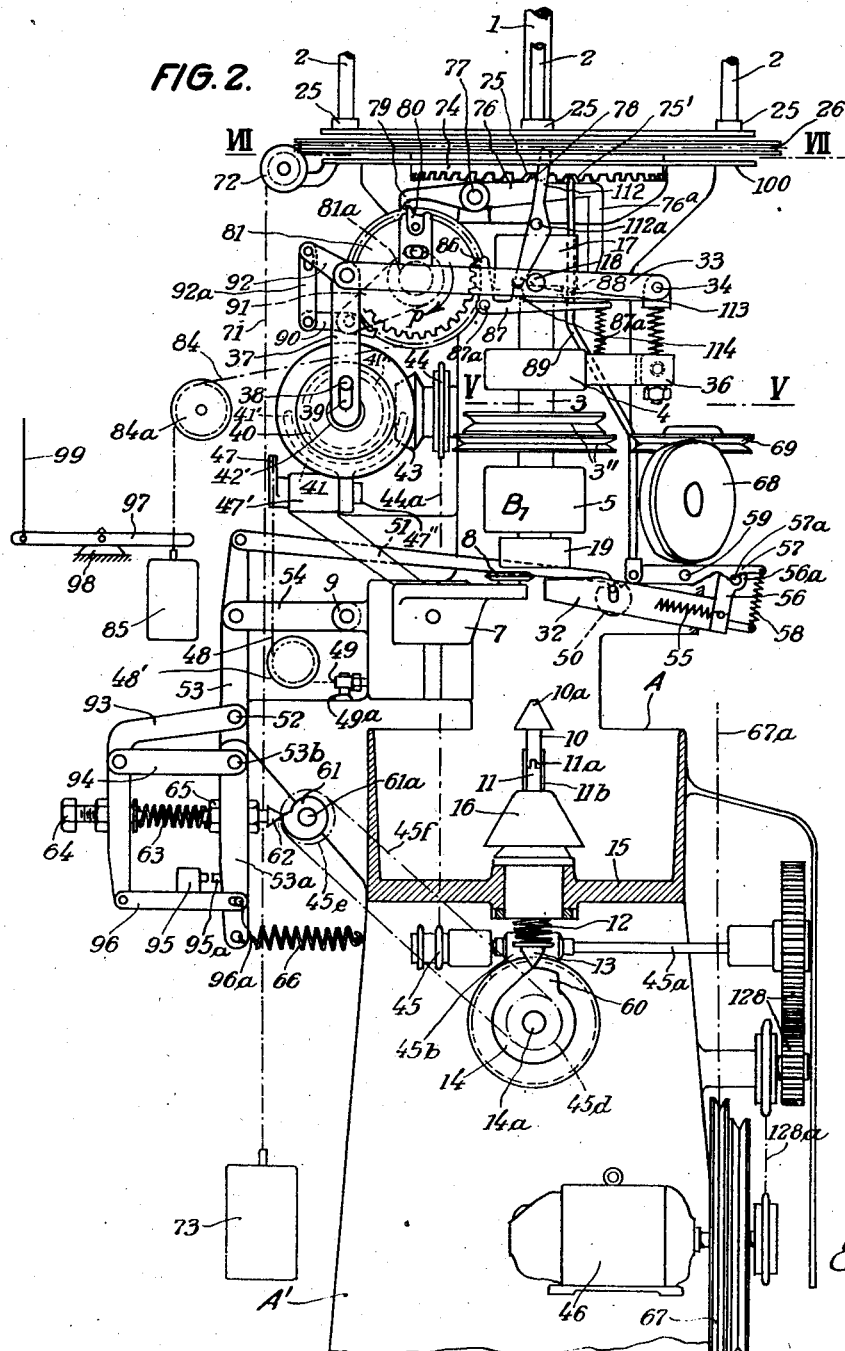

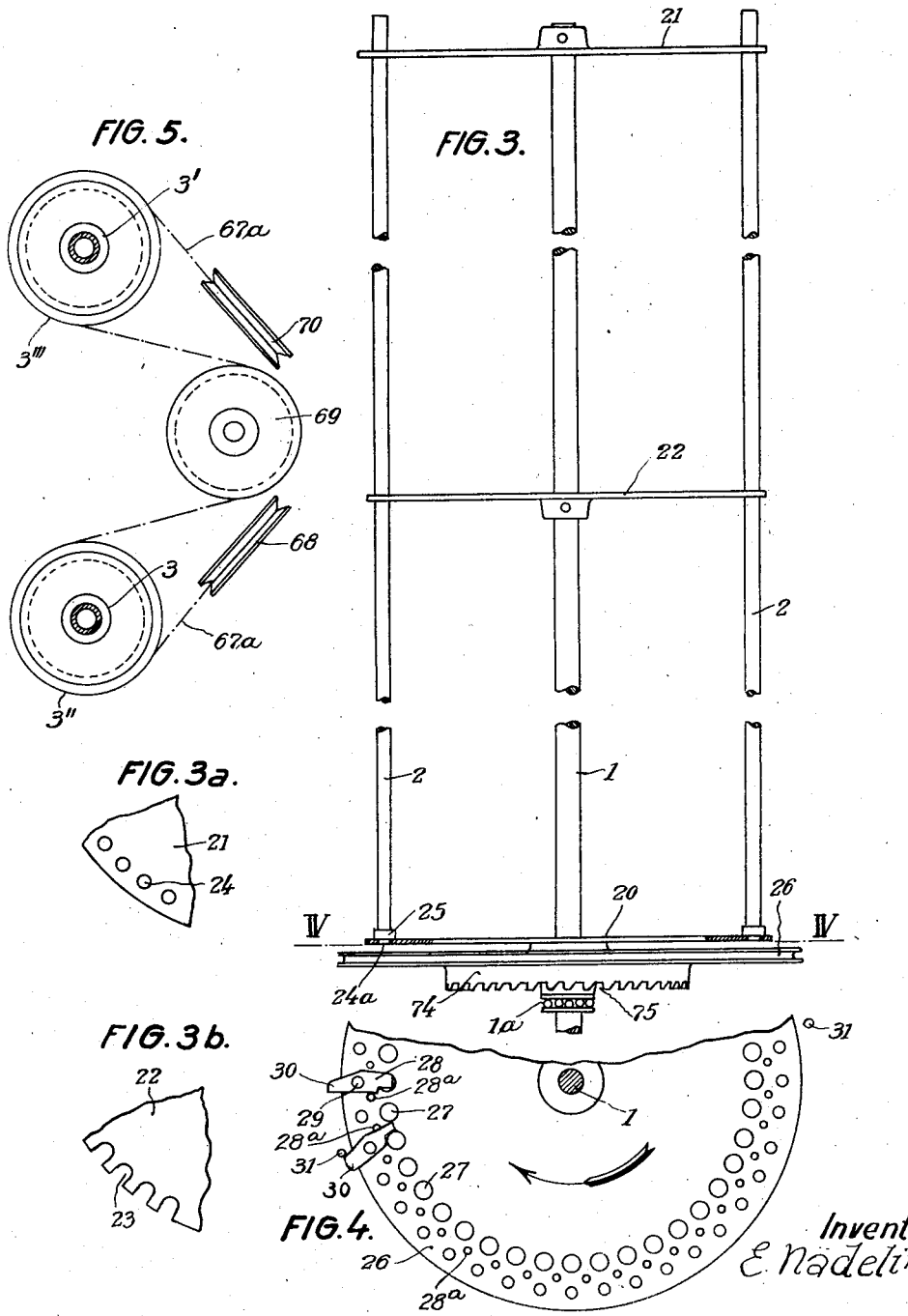

July 25, 1939.　　　　　E. NÄDELIN　　　　　2,167,308

MACHINE TOOL FOR BAR STOCK

Filed June 10, 1938　　　　　5 Sheets-Sheet 4

Inventor,
E. Nädelin

By Glascock Downing & Seebirt
Attorneys.

July 25, 1939.  E. NÄDELIN  2,167,308
MACHINE TOOL FOR BAR STOCK
Filed June 10, 1938  5 Sheets-Sheet 5
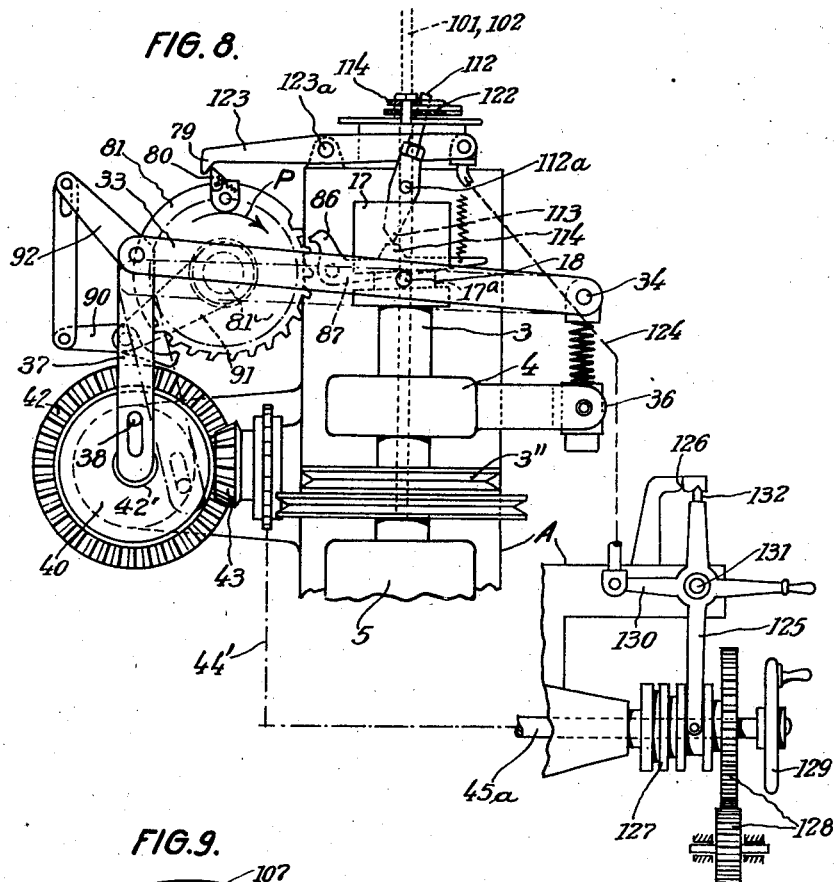
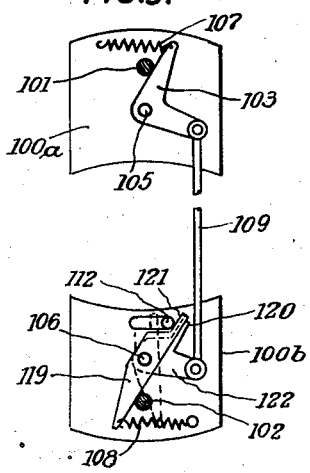
Inventor,
E. Nädelin
By Hascock Downing & Seebold
Attorneys.

Patented July 25, 1939

2,167,308

UNITED STATES PATENT OFFICE 2,167,308

MACHINE TOOL FOR BAR STOCK

Eugen Nädelin, Ebingen, Germany, assignor to Alfred Guhring, Ebingen, Wurttemberg, Germany Application June 10, 1938, Serial No. 213,041
In Germany June 12, 1937

7 Claims. (Cl. 29—62)

My invention relates to machine tools, and more especially to tools for the periodical machining of bar stock, such as machines for cutting off predetermined lengths from the stock bars, in which several tooling units are provided and all units are under a single control.

It is an object of my invention to improve a machine tool of this type, with a view to increasing the number of tooling operations under the control.

To this end, in combination with a plurality of tooling units, I provide a control which is operatively connected to all tooling units, means such as a lug on a ratchet wheel for adjusting the control for a predetermined number of machining operations on each bar in each unit, and mechanism which is influenced by the length of the bars being machined, for placing the control in active position.

By these means, a much greater number of tooling operations can be performed on a bar than with the control alone. The adjusting means, normally a lug on a ratchet wheel forming part of the control, is so adjusted that between the initial position of the control, and the presenting of a fresh bar at a tooling unit, the control is operated at least as many times as cutting operations are performed on the bar after it has been delivered to the tooling station.

In the accompanying drawings two machines embodying my invention are illustrated more or less diagrammatically by way of example.

In the drawings—

Figs. 1 to 7, inclusive, illustrate a machine with an indexed rotary stock reel for feeding the bar stock to the tooling units.

Figs. 8 and 9 illustrate a machine without the stock reel.

More particularly—

Fig. 1 is an elevation of the machine equipped with the stock reel.

Fig. 1a is a section on the line Ia—Ia in Fig. 1.

Fig. 2 is a side elevation of the machine, viewed from the right in Fig. 1 and partly in section on the line II—II in that figure.

Figure 3 is an elevation of the stock reel.

Fig. 4 is a section on the line IV—IV in Fig. 3.

Fig. 5 is a section on the line V—V in Fig. 2.

Fig. 8 is an elevation showing the upper portion of the machine without the stock reel.

Fig. 9 is a plan view of its table.

Figure 6:
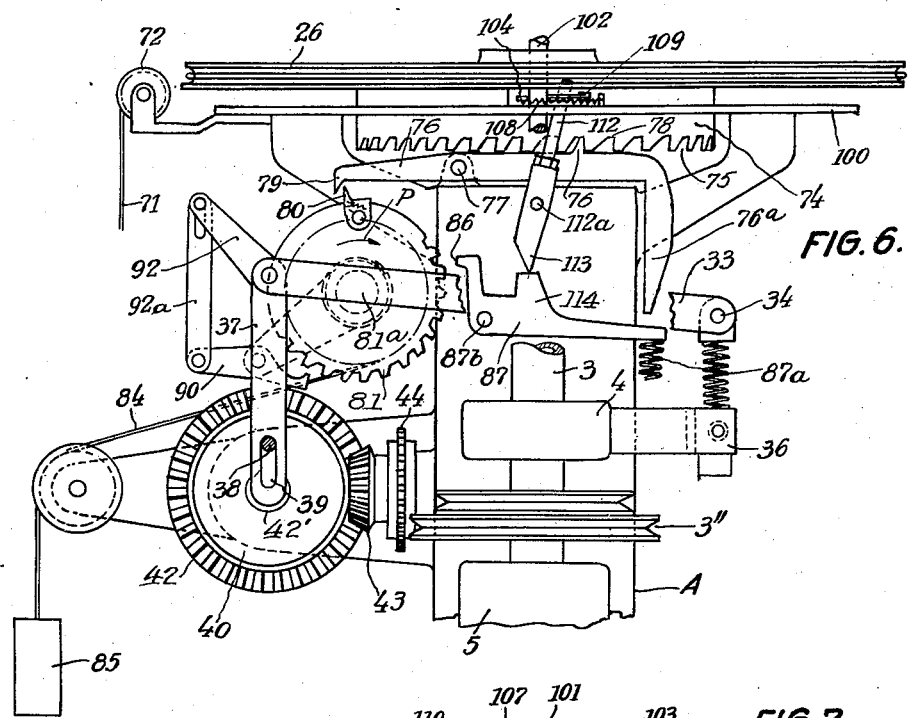
Fig. 6 is a detail showing that portion of the machine which is just below the stock reel, drawn to a larger scale.

Referring now to the drawings, and first to Figs. 1 to 7, this machine is equipped with a central shaft 1 about whose axis its stock reel rotates. The stock reel, as best seen in Figs. 3 and 4, comprises a top plate 21, with a circular row of holes 24, Fig. 3a, an intermediate plate 22, with notches 23 in its perimeter, Fig. 3b, and a base plate 20, with holes 24a arranged like the holes 24 in the top plate. The three plates are keyed on the shaft 1. Tubes 2 are arranged to be inserted in the holes 24 and 24a and in the notches 23, and are equipped with annular abutments at their lower ends which bear on the base plate 20. The intermediate plate 22 is merely a bracing member.

Keyed on the shaft 1 below the base plate 20 is a distributing disk 26, with a circular row of holes 27 in axial alignment below the holes 24a in the base plate 20, and a flap 28 arranged to normally cover each hole 28. The flaps, two of which only are shown, are pivoted at 29 and equipped with springs, not shown, normally holding them against checks 28a, in which position they are above the corresponding hole 27. In the position illustrated in Fig. 4, however, the two diametrally opposite flaps are engaged by checks 31 at their outer ends, or tails, 30, and their inner ends are moved so as to expose the corresponding hole 27. The checks 31 are secured to an annular table 100 below the distributing disk 26, by brackets 31', as shown in Fig. 1.

An indexing plate 74, with crown teeth 75, is arranged below the distributor 26, and a ball bearing 1a supports the lower end of the shaft 1 against the control shaft bearing 82 at the upper end of the machine frame A. The annular table 100 is secured to the upper end of the frame A by suitable arms and surrounds the indexing plate 74 with a clearance. A bearing on the table 100 supports a pulley 72 on which is placed a cord, or cable, 71, with its upper end secured in a groove in the perimeter of the disk 26, and a weight 73 at its lower end. The weight turns the disk 26 in the direction of the arrow in Fig. 4, unless it is retained by a tooth 78 on a detent 76 which is fulcrumed on the frame A at 77.

The machine is equipped with two tooling units, B₁ at the right, and B₂ at the left, Fig. 1, in the example illustrated, it being understood that more than two units may be provided, if desired. Since the units are quite similar, only the unit B₁ will be described, the corresponding parts in the unit B₂ being distinguished by the index "l".

Each unit has a hollow shaft, 3 in the unit B₁, whose radial distance from the shaft 1 is equal to the radius of the circular row of holes 24a in the base plate 20, and 27 in the distributor 26. The shaft 3 is driven by a double rope pulley 3″ between an upper bearing 4 and a lower bearing 5 for the shaft. A motor 46 is arranged in the base A′ of the machine and a pulley 67 is keyed on its shaft. A rope or cable 67a is placed about the pulley 67, a pair of vertical pulleys 68 and 70, the double pulleys 3″ and 3‴ on the shafts 3 and 3′, respectively, and a horizontal pulley 69 intermediate the two vertical pulleys. The purpose of this one-sided and comparatively complicated arrangement is to remove the belt 67a from the central portion of the machine where the space is occupied by other parts.

At its lower end the hollow shaft 3 is equipped with a chuck for engaging the bar stock delivered to it from the cage, as will be described, so that each bar rotates with the hollow shaft. The chucks have not been illustrated in detail as they may be of any suitable type. A sleeve 17, with a groove 17a, is mounted to slide on the upper end of each shaft, and is connected to the corresponding chuck by any suitable means, not shown. A pair of pins 18 in a chuck-control lever 33 engage in the groove 17a of the sleeve 17. The lever, at one end, is fulcrumed on a pin 34 which is supported by a spring 35 at the free end of a bracket 36 which is secured on the lower bearing 4 of the shaft 3. A connecting rod 37 is pivoted to the free end of the lever 33 and, with a slot 39, engages a pin 38 on a crank disk 40. A similar crank disk 40′, with a pin 38′, is provided for the unit B2. The crank disks are keyed on the opposite ends of a shaft 42′ which is mounted to rotate in bearings, not shown, on the frame A. A bevel gear 42 is mounted to rotate on the shaft 42′, and rotation is imparted to the bevel gear by means which will presently be described. A clutch sleeve 41″ is splined on the shaft 42′ for connecting the bevel gear 42 to the shaft. A spring, not shown, tends to throw out the clutch. For throwing in the clutch against the action of its spring, a fork-shaped lever 41 is secured on a shaft 47″ which is mounted to turn in a bearing 47′. The bearing is connected to the frame A by a rib, as best seen in Fig. 2. A clutch-operating crank 47 is also keyed on the fork shaft 47″, and is operated by a cable 48, as will be described. When the clutch 41″ has been thrown in by pins 41′ at the ends of the forked arms 41 engaging in a groove in the sleeve 41″, the spring is compressed and the shaft 42′ is rotated through one revolution, at the end of which the clutch is thrown out automatically by a cam or the like, and is returned into its inactive position by its spring. Clutches of this kind are old in the art, and so this one needs no detailed description. A sprocket 44 is connected to the bevel gear 43, and is rotated from the shaft of the motor 46 through a chain-and-sprocket mechanism 128a, spur gears 128, a shaft 45a, and a sprocket 45 on the shaft.

To the free end of the crank 47 is connected a cable 48. The other end of the cable extends to one arm of a double-armed horizontal lever 49 which is fulcrumed on the frame A at 49a over a pulley 48′, as best seen in Fig. 1a. The other arm of the double-armed lever is equipped with an adjustable abutment 49b. The reaction of the clutch spring against the throwing-in of the clutch 41 exerts tension on the cable 48 and holds the free end of the abutment 49b against the front end of a slide 7 which supports the cutter 8 for the unit B1.

A pair of inclined guides 6, 6′ are formed on the frame A. The carriage 7, with its cutter 8, is mounted to slide on the guide 6, and a similar slide 7′, with a cutter 8′, is mounted to slide on the other guide 6′. Reciprocation is imparted to the slide 7 by a mechanism illustrated in Fig. 2, it being understood that an exactly similar mechanism, not shown, is provided for the slide 7′.

A cam shaft 14a, with a cam 14 at one end, and a cam 14′ at the other end, is mounted below the shaft 45a in the base A′ of the frame A and is rotated by a worm 45b on the shaft 45, and a worm gear 45c on the cam shaft. A sprocket 45d on the cam shaft is connected to a sprocket 45e on a shaft 61a at one side of the frame A by a chain 45f. Keyed on the shaft 61a is a cam 61 which cooperates with a camming member 62 on an arm 53a. A spring 66 is connected to the lower end of the arm 53a, and its upper end 53b is pivotally connected to the lower end of another arm 53 which is fulcrumed on the frame A at 52. A link 54 connects the upper arm 53 to a pivot 9 on the carriage 7.

The camming member 62 is mounted to be displaced on the lower arm 53a for varying the stroke of the carriage 7, the camming member being held against turning and fixed in position on the arm 53a by a nut 65. An angular arm 93 is pivoted at 52 with its upper end, connected to the pivot 53b by a link 94 near its bend, and connected to a link 96 at its free lower end. The free end of the link 96 is slotted and engages over a pin 96a on the lower arm 53a. A compression spring 63 is inserted between the nut 65 and a screw 64 in the angular arm 93. In the position illustrated, the lower arm is free to turn clockwise against the pressure of the spring 63.

Arranged below, and in line with, the hollow shaft 3 of the unit B1 is a mandrel 10, with a tapered member 10a at its upper end. The mandrel 10 is pivoted to a slide 11 at 11a, and a sleeve 11b is placed over the joint to keep the parts straight. The lower end of the slide 11 is supported by a spring 12 on a camming member 13 which cooperates with the cam 14 and, in the position illustrated in Fig. 2, is just about to be engaged by the descending portion of the eccentric 60.

The mandrels are mounted to slide in troughs 15 and 15′, respectively. The hole for the mandrel is surrounded by an elevated flange, and a cap 16 protects the lower portion of the slide against chips. The severed ends of the bars are delivered to a chute 15a, with a perforated bottom 15b allowing oil to flow into the trough 15, and the chute delivers the ends to a collector 15c.

Arranged below the chuck 19 is a retainer slide 32. The slide has a toothed member 50, with two teeth adapted to be engaged alternately by the free end of a pawl 51 whose other end is fulcrumed to the upper end of the upper arm 53. The pawl 51 obviously partakes in the oscillation of the arm 53 as it reciprocates the slide or carriage 7. When the carriage performs its forward stroke the slide 32 is forced back against the action of a return spring 55 and is locked in this position by a tooth 57a on a pawl 57 engaging in a recess 56a in the upper end of an extension 56 at the rear of the slide 32. The pawl 57 is fulcrumed at 59 and its outer end is connected to the outer end of the extension by a spring 58.

A push rod 89 whose upper end is arranged to cooperate with the crown teeth 75 of the indexing plate 74, is pivotally connected to the inner end of the pawl 57 at its lower end.

The control will now be described. The control includes the shaft 42' on which the bevel gear 42 is mounted, and certain parts making up a timing mechanism. A shaft 81a is mounted to rotate in the bearing 82 already referred to. On that end of the shaft which is in the vicinity of the right-hand unit B₁, is keyed a timing wheel 81 which is here constructed as a ratchet wheel, and on the opposite end is keyed a pulley 83 to which is connected the upper end of a belt 84. The belt rests on a pulley 84a and at its lower end supports a weight 85 tending to turn the ratchet wheel in the direction of the arrow p, Fig. 2. A lug 80 is adjustably secured on the ratchet wheel 81 for cooperation with a hook 79 at one end of the detent 76. The sides of the hook and of the lug are shaped like edges, and the lug is free to yield toward the left in Fig. 2, so that the tooth 78 immediately engages in the next gap of the indexing plate 74. In order to prevent skipping of a gap by the tooth 78, the longer arm 76a of the detent 76 is crooked at right angles, and the lower end of the crooked portion bears on the tail of a retaining pawl 87 which is urged in upward direction by a compression spring 87a on the bracket 36. The retaining pawl is fulcrumed on the frame A at 87b and a tooth 86 at its upper end engages between the teeth of the ratchet wheel 81. A lug 88 on the push rod 89 bears against the tail of the pawl 87 from above. Mounted to turn freely about the control shaft 81a is an arm 91 on whose free end a feeding pawl 90 is fulcrumed. A lever 92 and a link 92a connect the tail of this pawl to the chuck-control lever 33.

The mechanism which is influenced by the length of the stock, and places the timing mechanism 81, etc., in active position, will now be described with reference to Figs. 6 and 7.

Fulcrumed on the annular table 100 at diametrically opposite points 105 and 106 are bellcranks 103 and 104 whose longer arms are connected to springs 107 and 108, holding them against bars 101 and 102, respectively, which descend from two tubes 2 of the stock reel through holes in the table 100. The shorter arms of the bellcranks are connected by a rod 109 which is pivotally connected to the bellcrank 104 and engages the bellcrank 103 with a slotted eye 110. A bolt 112 is fulcrumed below the table 100 at 112a. Its upper end is engaged by a slot in the bellcrank 104 and its lower end 113 bears against a lug 114 on the retaining pawl 87, holding its tooth 86 beyond reach of the teeth of the ratchet wheel 81 while the bellcranks 103 and 104 are in their full-lines position, i. e., are retained by the bars 101 and 102 against the action of their springs 107 and 108.

The operation of this machine is as follows:

The stock reel is filled with bar stock by lifting its tubes 2 from the holes 24a in the base plate 20, moving their lower ends away from the shaft 1 of the stock reel—which is permitted by some clearance in the holes 24 of the upper plate 21—inserting a bar in each tube, and returning the tubes into their holes 24a with their lower ends. The lower ends of the bars are supported by the flaps 28. The stock reel turns in the direction of the arrow in Fig. 4 under the action of the weight 73 when released by the detent 76. When two diametrally opposite tubes arrive in that position in which their flaps are opened by the checks 31, the bars in the tubes are dropped through the holes 27 and into the hollow unit shafts 3 and 3'. The chucks 19 and 19' are opened by the crank pins 38 and 38' and the connecting rods 37 and 37' and the slides 32 and 32' are in their inner final position and arrest the bars for the present. As mentioned, the shaft 42' on which the crank disks 40 and 40' are secured, is coupled with the bevel gear 42 for one revolution against the action of the spring in the clutch 41. This is effected by the carriage 7, upon its quick return, engaging the abutment 49b of the lever 49, Fig. 1, and, through the cable 48, turning the crank 47 and the fork 41 anti-clockwise. By these means, the chucks 19 are opened and closed periodically. Since the fulcrum 34 of the chucking lever 33 is supported by the spring 35, a certain yield is provided for so that the chucks 19, 19' are not damaged if stock of too large diameter is supplied.

The carriage 7 is reciprocated by the cam 61 and, on its quick return, as described, couples the shaft 42' to the bevel gear 42, the shaft performs one revolution and the clutch 19 is opened, allowing the bar to descend by gravity until it is intercepted by the inner end of the slide 32. When the chuck has been opened for the second time, the bar is presented to the cutter 8 which now, upon the second advance of the carriage 7, trims and shapes the lower end of the bar. The part which is removed in this way is but a few millimetres long and by the trimming the deformation caused by the shearing of the stock at the mill, is removed. Upon the second return of the carriage 7, the shaft 42' is again coupled to the bevel gear 42. In the meantime, the slide 32 has been withdrawn by the pawl 51, and the bar now descends as far as the mandrel 10a by which it is elastically arrested under the action of the spring 12, the mandrel being then in its elevated position under the action of the eccentric portion 60 at the cam 14. The chuck 19 is now closed again, and a piece of the prescribed length is cut from the bar by the cutter 8 which now advances again with the slide 7. When the comparatively heavy bar strikes the mandrel, it is thrown back by the reaction of the spring 12, and then assumes the proper position. The lag required for this is provided for by the slot 39 in the connecting rod 37. The first operation is now completed, and the severed pieces from both bars are delivered to the collectors 15c and 15c'.

As the chucking lever 33 oscillates, the feeding pawl 90 is reciprocated but only turns the timing ratchet wheel 81 idly while a bar is still partly in the corresponding tube 2 of the stock reel, and partly in the corresponding unit shaft 3, 3'. While this condition lasts, the bars 101 and 102 hold the bellcranks 103 and 104 in the full-lines position of Fig. 7 against the action of the springs 107 and 108. But when the upper end of each bar has left the cage altogether after the bar has been finished, the springs throw the bellcranks into the position indicated in dotted lines. On account of the connection 109, 110, the spring 108 can throw over its bellcrank 104 only after the other bellcrank 103 has been thrown over by its spring 107. The locking pawl 112 is now turned anti-clockwise by the forked inner end of the bellcrank 104 and its lower end 113 releases the lug 114 on the retaining pawl 87 so that the spring 87a now urges the tooth 86 of the pawl into the gaps between the teeth of the timing gear wheel 81 under the resilient pressure of the spring 87a, allowing the timing gear wheel 81 to be turned against the arrow p since the flanks of its teeth slope at the corresponding side. The feeding pawl 90 now takes action on the gear wheel and turns it against the arrow p and the action of the weight 85. Each operation of the feeding pawl corresponds to one operation of the cutters 8 and 8' on the bar, i. e., every time a piece is detached. When the timing gear wheel has performed a certain number of partial revolutions—as determined by the adjustment of the lug 80,—this lug engages the hook 79 at the end of the detent 76, causing the tooth 78 to release the indexing disk 74 at the tooth 75 it had engaged so that the weight 73 turns the cage in the direction of the arrow in Fig. 4 until the detent engages the next tooth 75 and arrests the stock reel in a position in which two fresh bars are presented to the hollow shafts 3 and 3'. When the detent 76 is turned to make its tooth 75 clear the indexing disk 74, the crooked arm 76a of the detent depresses the tail of the retaining pawl 87, disengaging its tooth 86 from the teeth of the timing gear 81, and allowing the weight 85 to turn the gear in the direction of the arrow p. When the fresh bars have been liberated by the flaps 28, as described, they return the bellcranks 103 and 104 into their initial position, full lines in Fig. 7, and the retaining pawl 87 is again thrown out by the bolt 112.

When the retaining pawl 87 is moved into its active position after having been released by the bolt 112, it elevates the rod 89 by means of the abutment 88 so that its end engages between the teeth 75 of the indexing plate 74. During the indexing of the stock reel, the rod 89 is depressed for a short time by the engagement of its beveled upper end with the beveled flange 75' of the corresponding tooth 75, and its pawl 75 releases the slide 32 which is now returned into its inner final position below the chuck 19 by its return spring 55.

When the retaining pawl 87 has released the timing gear wheel 81, the weight 85 returns the gear wheel into its initial position in the direction of the arrow p. In its initial position, a lug—not shown—on the gear wheel bears against a fixed abutment—not shown—under the pressure of the weight 85. By suitable adjustment of the lug 80 on the control gear wheel 81 the number of operations to be performed on the two bars in the units B₁ and B₂, until the stock reel is indexed, can be determined. Consequently, the lug 80 is so adjusted that as many feeding movements are imparted to the gear wheel 81 by the feeding pawl 90, as cutting operations are performed until the subsequent indexing of the stock reel. Preferably, an idle step is performed at the end of the cycle, for allowing the remainder of the bar to be removed.

Means are provided for automatically arresting the machine if trouble occurs, or if the supply of bars in the stock reel has become exhausted.

When the resistance against the operation of the cutters 8, 8' becomes excessive because the material of the bar stock is too hard, or the tool has not been properly heat-treated, or has become blunt, the lower arm 53a is turned clockwise by the cam 61 against the action of its spring 66, and the spring 63 is compressed, since the upper arm 53 is restrained by the excessive resistance at the cutter 8 or 8'. The angular arm does not partake in the movement of the lower arm 53a, since it is anchored to the upper arm 53 at 53b by the link 94. Therefore, the lower end of the angular arm to which the slotted link 96 is pivoted, is stationary and as the lower arm 53a moves clockwise, a contact pin 95a on the arm engages a contact 95 on the link 96 and, by suitable means, not illustrated, a circuit is operated for cutting out the motor 46.

Mechanical means might also be provided for arresting the machine. Thus, the link 96 might be weighted and supported on the lower arm 53a by a hook or the like, so that the link and its weight are dropped upon movement of the lower arm.

For arresting the machine when the stock reel is empty, a seat for the weight 73 might be provided on which the weight arrives after one half revolution of the stock reel, or a lug on the distributor 26 might be arranged to engage a fixed abutment. In this case the rods 89 and 89' are not depressed and their abutments 88, 88' hold the retaining pawl 87 in such position that its tooth engages between the teeth of the control gear 81. The gear wheel cannot now be turned in the direction of the arrow p and so it is not fed from its initial but from its final position, and the weight 85 is raised beyond its normal position. It engages one end of a double-armed lever 97 which is fulcrumed at 98. A cable 99 for arresting the machine is attached to the other end of the double-armed lever for arresting the machine by mechanical means. Obviously, contacting means might be provided for the same purpose.

If the diameter of the bar stock is so small that the chucks 19, 19' are unable to engage the bars, the latter are not rotated and the effect is the same as in the case of too hard material, etc., as described above. On the other hand, if the stock is too large for the chucks, it cannot move through the open chucks and so the cage cannot be indexed and the retaining pawls cannot be moved into active position.

Obviously, the machine may be modified in various ways without departing from my invention. Thus, as mentioned more than two tooling units might be provided, or the machine might be equipped with lathe tools for shaping as well as cutting the bar stock.

Figure 7:
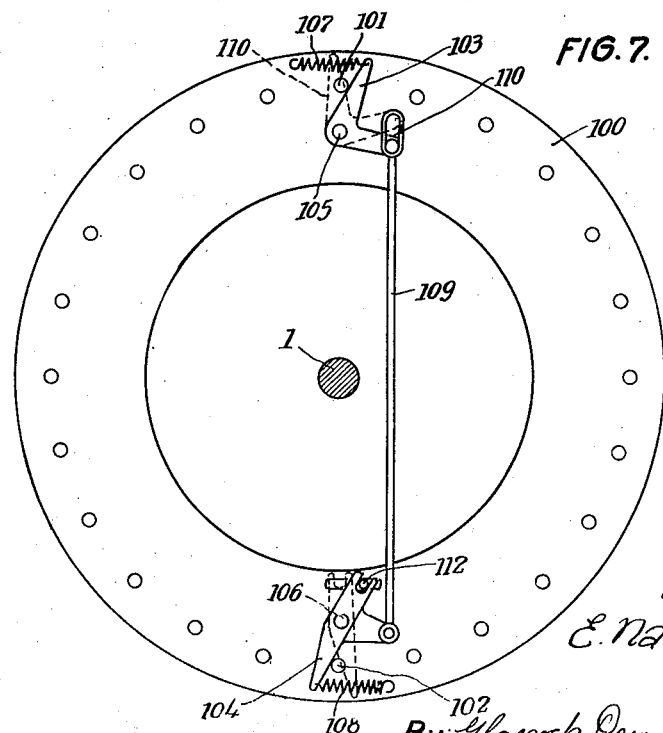
Fig. 7 is a section on the line VII—VII in Fig. 2.

In the machine which has been described, the operation of the control and its timing mechanism, is determined by the longest bar in the stock reel, for it will appear from Fig. 7 that the locking pawl 112 is not influenced by bars of shorter length. While this arrangement is generally satisfactory, it has the drawback that the end of a shorter rod which has not the full length of the sections to be severed, is of irregular shape. When it occurs that such an end is presented to a tool 8 or 8', the tool will be damaged.

In the machine which will now be described with reference to Figs. 8 and 9, such accidents are eliminated by arranging for the shortest bar to determine the operation of the control and the timing mechanism.

The machine illustrated in Figs. 8 and 9 is substantially similar to the machine illustrated in Figs. 1 to 7 and therefore it has not been completely shown. It is distinguished only by certain details, as will now be described.

The stock reel is dispensed with and instead of the annular table 100, this machine has only two diametrally opposite small tables 100a and 100b. The bellcrank 103 is arranged on the table 100a as described with reference to Fig. 7 but the mechanism on the table 100b is modified. A double-armed lever 119 is fulcrumed on the table 100b at 106, and the spring 108 holds its outer end against the bar 102. At its inner end, the lever has a finger 121 for cooperation with the upper end of the locking bolt 112. In order to operate the locking bolt from the bellcrank 103, the connecting rod 109 (without the slotted eye 110) is pivotally connected to one arm of a bellcrank 122 also fulcrumed at 106 and equipped with a finger 120 at its other arm for engaging the bolt 112. Obviously, the shortest bar will cause the bolt 112 to release the retaining pawl and consequently the beginning of the operation of the control, and its end, are determined by the shortest length of stock.

The detent 76 is here replaced by a double-armed lever 123 fulcrumed at 123a and equipped at one end with the nose 79 for cooperation with the adjustable lug 80, as described. The other end of the lever 123 is connected, by a rod 124, to the arm 130 of a four-armed clutching lever 125 which is fulcrumed at 131 and equipped with a detent 132 adapted to engage two notches 126 in a bracket on the frame A. The lever 125 engages a clutch 127 for connecting the shaft 45a to the gearing 128. In the position illustrated in Fig. 8, the clutch 127 is thrown in, and it is thrown out by turning the lever 125 anti-clockwise. The connection is so designed that the clutch 127 is thrown out when the link 37 is in the position shown in dotted lines in Fig. 8, i. e., the machine is arrested when the chucks 19 and 19' are open so that any bar ends which have not dropped out, can be removed by hand.

A hand wheel 129 is secured on the outer end of the shaft 45a for moving the carriages 7 and 7', the control 81, and the chucks 19 and 19' by hand independently of the drive of the machine. By turning the hand wheel 129, the lug 80 is moved clear of the hook 79 at the free end of the lever 123 so that this lever, and the clutching lever 125, can be manually returned into that position in which the clutch 127 is thrown in. At the same time, the weight 85 is free to return the control bevel gear 81 into its initial position.

This machine may be simplified by providing an upward extension on the retaining pawl 87 which replaces the locking bolt 112. Such an arrangement is particularly suitable for machines having a single tooling unit only, since in this case the extension can be made integral with a member adapted to be engaged by the bar stock, like the bellcrank 103, or the double-armed lever 119, Fig. 9.

I claim:

1. In a machine tool for the periodical machining of bar stock, a plurality of tooling units, a control operatively connected to all units, means for adjusting the control for a predetermined number of machining operations on each bar in each unit, and mechanism influenced by the length of the bars for placing the control in active condition.

2. In a machine tool for the periodical machining of bar stock, a plurality of tooling units, a control operatively connected to all units, means for adjusting the control for a predetermined number of machining operations on each bar in each unit, mechanism influenced by the length of the bars for placing the control in active condition, means for supplying stock to all units, and means operatively connected to the control for indexing the stock-supplying means.

3. In a machine tool for the periodical machining of bar stock, a plurality of tooling units, a control operatively connected to all units, means for adjusting the control for a predetermined number of machining operations on each bar, a locking bolt for holding the control in inactive condition, and a spring-actuated lever arranged to be engaged by the bar which is being machined at the time, and to engage the locking bolt under the action of its spring and to release the control, after the bar has moved clear of the lever.

4. In a machine tool for the periodical machining of bar stock, a plurality of tooling units, a control operatively connected to all units, means for adjusting the control for a predetermined number of machining operations on each bar, and a pair of interengaged mechanisms each influenced independently by the length of the bars, for placing the control in active condition.

5. In a machine tool for the periodical machining of bar stock, a plurality of tooling units, a control operatively connected to all units and including a timing mechanism, and means for operating the timing mechanism; a pawl for rendering the timing mechanism responsive and inresponsive to the operating means, automatic means tending to move the pawl into its responsive-rendering position, a system arranged to be locked against operation, and to be released for operation, by the bar stock: for holding the pawl in its inresponsive-rendering position when the system is locked, and for releasing the pawl to move into its responsive-rendering position under the action of the said automatic means when the system is released, and automatic means for operating the system after it has been released.

6. In a machine tool for the periodical machining of bar stock, a plurality of tooling units, a control operatively connected to all units and including a timing mechanism, and means for operating the timing mechanism; a pawl for rendering the timing mechanism responsive and inresponsive to the operating means, automatic means tending to move the pawl into its responsive-rendering position, a bolt for holding the pawl in its inresponsive-rendering position, a swinging lever arranged at each tooling unit, automatic means for holding each lever against the bar being tooled in the corresponding unit, means operatively connecting one of the levers to the bolt so that the bolt holds the pawl in its inresponsive-rendering position when the lever is held against the bar by its automatic means, and the bolt is moved to release the pawl when the bar has moved past the lever, and its automatic means has become active; a connecting rod which is pivoted to the bolt-controlling lever at one end, and a slotted eye at the other end of the connecting rod arranged to engage the other lever and to allow it to move independently of the bolt-controlling lever under the action of its automatic means.

7. In a machine tool for the periodical machining of bar stock, a plurality of tooling units, a control operatively connected to all units and including a timing mechanism, and means for operating the timing mechanism; a pawl for rendering the timing mechanism responsive and inresponsive to the operating means, automatic means tending to move the pawl into its responsive-rendering position, a bolt for holding the pawl in its inresponsive-rendering position, a swinging lever arranged at each tooling unit, automatic means for holding each lever against the bar being tooled in the corresponding unit, means operatively connecting one of the levers to the bolt so that the bolt holds the pawl in its inresponsive-rendering position when the lever is held against the bar by its automatic means, and the bolt is moved to release the pawl when the bar has moved past the lever, and its automatic means has become active; a member arranged to move the bolt-controlling lever only in that direction in which the bolt is moved to release the pawl, and a connecting rod pivoted to the member at one end, and to the other lever at its other end.

EUGEN NÄDELIN.